Sept. 30, 1941.  R. C. PIERCE  2,257,647
TIRE CASING
Filed Nov. 9, 1939  2 Sheets-Sheet 1

INVENTOR.
ROBERT C. PIERCE
BY Booth & MacDuff
ATTORNEYS.

Sept. 30, 1941. R. C. PIERCE 2,257,647
TIRE CASING
Filed Nov. 9, 1939 2 Sheets-Sheet 2

INVENTOR.
ROBERT C. PIERCE
BY Booth & MacDuff
ATTORNEYS.

Patented Sept. 30, 1941

2,257,647

UNITED STATES PATENT OFFICE 2,257,647

TIRE CASING

Robert C. Pierce, Niles, Mich., assignor to National Standard Company, Niles, Mich., a corporation of Michigan Application November 9, 1939, Serial No. 303,600

3 Claims. (Cl. 152—358)

This invention relates to tire casings and more particularly to tire casings reinforced with flat metallic tapes.

One of the objects of the invention is to provide a tire casing which has relatively thin flexible side and tread walls reinforced with flat metallic tapes.

Another object of the invention is to provide a tire casing reinforced with flat metallic tapes having associated therewith strands or cords of non-metallic material carrying a bonding material. In this way a strong uniform bond between the tapes and the rubber or other material of the tire casing is insured.

Other objects and advantages of the invention including desirable constructions and arrangements of the metallic tapes and of the non-metallic strands will be apparent from the following description when read in connection with the accompanying drawings, in which.

Figure 1:
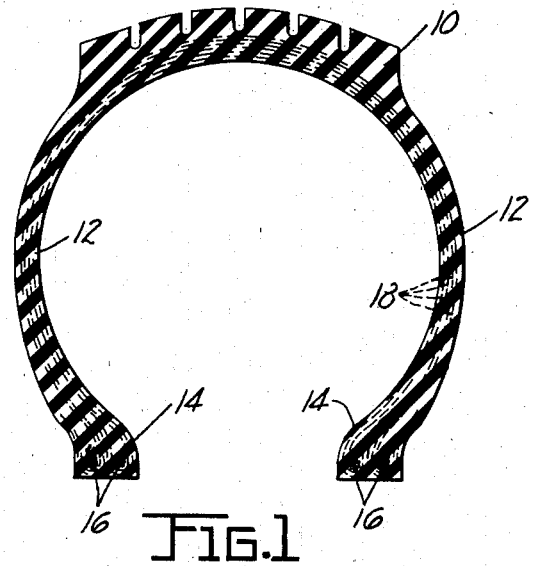
Figure 1 is a section through a tire casing embodying the invention.

The illustrated tire comprises a tread 10, side walls 12 and beads 14 reinforced by bead rings 16. The bead rings 16 may be of any desired construction such as braided metal wires or metal wires laid up in the form of a tape or rope.

The tread and side walls are reinforced by several layers of tension elements 18, four being shown, which are turned up at their ends around the bead rings 16 and are imbedded in the rubber of the tire casing. If desired narrow layers of similar elements 20 may be laid under the tread to form breaker strips reinforcing the tread.

According to the present invention the fabric cords usually employed for the tension elements 18 are replaced by flat tapes formed at least in part of metal wires. Since the metal wires have much greater tensile strength for the same volume than fabric cords a tire of the same load carrying capacity may be formed with fewer layers of reinforcing elements and much thinner walls. This tends to produce greater flexibility, reduce weight, and to facilitate vulcanizing since the heat must travel through a shorter distance.

However, in order to provide tires which will operate successfully it is essential that the reinforcing elements be bonded securely to the rubber of the tire casing, and this is one of the principal aims of the present invention.

Figure 4:
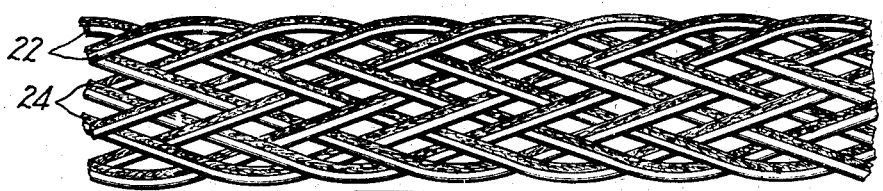
Figures 4 to 9 are enlarged plan views of several alternative reinforcing elements which may be employed in the tire casing.

As shown in Figure 4 the reinforcing elements are formed of a flat braid with pairs of strands passing alternately over and under other pairs of strands diagonally back and forth across the braid. As shown one strand 22 of each pair is a metal wire, and the other strand 24 is of non-metallic yielding material. The metal wires 22 are preferably of high strength steel of the order of .006" in diameter and coated with bonding material such as zinc and copper plate or bonding lacquer. The strands 24 may be of rubber, synthetic rubber or other plastic or of any desired fiber such as cotton, linen, hemp, rayon, silk, wool, jute or sisal. In the braid as shown each pair of strands passes alternately over and under two other pairs, but it will be understood that any other desired weave could be used.

The yielding strands 24 are preferably impregnated or coated with a bonding material such as latex or rubber cement to facilitate bonding of the tension elements to the rubber of the tire body. This bonding material not only covers the yielding strands, but will also coat, at least partially, the wires 22 to assist in bonding the wires to the tire body.

Figure 2:
Figure 2 is an enlarged partial section through the casing side wall.
Figure 3:
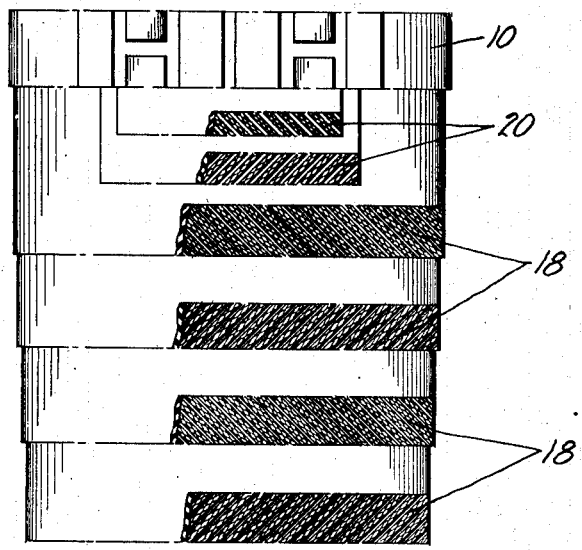
Figure 3 is a plan view of the tire casing with the several layers successively broken away.

The braids may be incorporated into the rubber of the tire body by calendaring in the same manner as with the usual fibrous cords. In the tire body the braids lie flat side by side, as seen in Figures 2 and 3, to provide a very thin, flexible wall of very high strength. The rubber of the tire casing will bond to the strands 22 and 24 and will also bond to itself through the interstices of the braid around and between the strands to fasten the tension elements securely in the rubber of the tire casing. The braids are highly flexible and are resilient in both tension and compression so that the tire may flex without damage to the braids and without danger of pulling the braids loose from the rubber.

Figure 5:
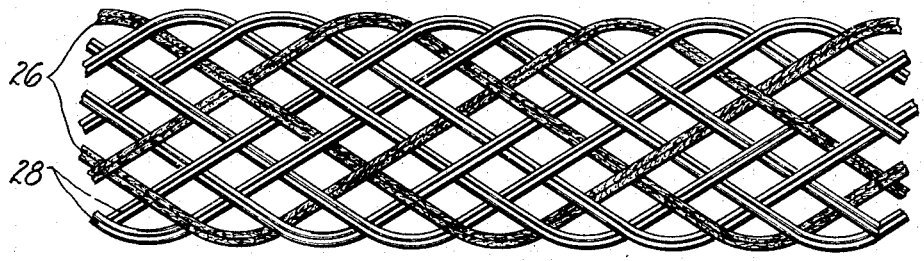

Figure 5 illustrates another braid construction similar to that of Figure 4 in which pairs of strands 26 are of yielding material while other pairs 28 are both metal wires. In this braid the strands 26 are impregnated or coated with bonding material and the braid acts similarly to that of Figure 4.

Figure 5 illustrates another feature which may be applied to any of the braids shown in that the braid in this figure is expanded. This is generally accomplished by compressing the braid lengthwise to spread it across its width until the wires have been bent beyond their elastic limit at the point where they bend back at the edges of the braid. This provides a more resilient structure for both tension and compression and opens up the interstices of the braid, so that the rubber may bond upon itself more readily therethrough.

Figure 6:
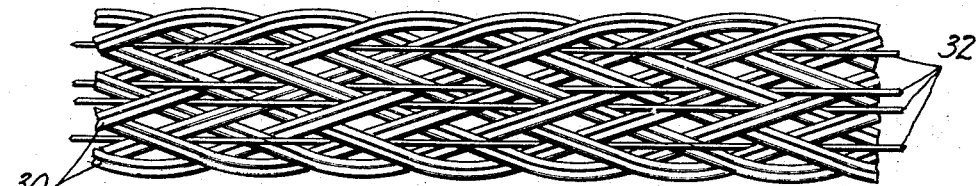

Figure 6 shows still another braid construction in which all of the strands 30 are metal wires and a plurality of strands 32 are woven back and forth from top to bottom longitudinally of the braid through the interstices thereof. The strands 32 may be metal wires or non-metallic yielding material coated or impregnated with bonding material.

Figure 7:

Figure 7 illustrates an alternative construction of tension element in the form of a flat tape formed by a series of metal wires 34 laid side by side in parallel. If desired yielding strands 36 may be placed between the wires 34 although such yielding strands need not be used. The wires and strands are held in place by a strand 38 woven back and forth diagonally across the tape and passing alternately over and under the wires 34 and the strands 36. The strand 38 may be either metal or fiber as desired.

The yielding strands 36, when used, are impregnated or coated with bonding material to insure uniform bonding of the tape to the rubber of the tire casing. With this material, as with the braid, the rubber of the tire casing bonds to the wires and strands and to itself around and between the wires and strands.

Figure 8:

The construction of Figure 8 is similar to that of Figure 7 and includes a flat tape formed of metal wires 40 lying side by side in parallel and held together in the form of a flat tape by being imbedded in rubber shown at 44, the wires being suitably coated so as to adhere to the rubber. If desired, yielding cords or strands may be placed between the wires 40, the cords or strands preferably being coated or impregnated with bonding material. These tapes may be used in the same manner as the other tapes described above.

The tapes of Figures 7 and 8, although not resilient in tension and compression to the same degree as the braids of Figures 4, 5 and 6 are highly flexible and due to their strength permit the making of tires with walls so thin as to be flexible without creating large stresses in the reinforcing elements.

Figure 9:
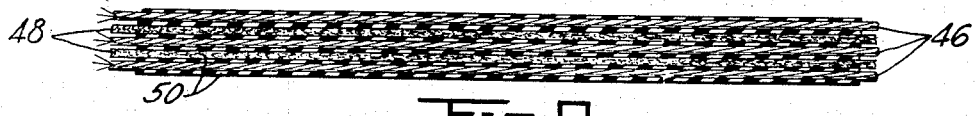

Figure 9 illustrates a construction identical with that of Figure 8 except that the wires 40 are replaced by a plurality of wires twisted together in the form of metal strands 46. Yielding cords or strands 48 lie between the strands 46 and all of the strands are bound together in the form of a flat tape by rubber 50. While wires have been referred to and illustrated in Figures 4 to 8 it is to be understood that metal strands such as 46 could be substituted therefor throughout if desired.

Although several embodiments of the invention have been illustrated and described in detail, it will be understood that these are illustrative only and are not to be taken as a definition of the scope of the invention, reference being had for this purpose to the appended claims.

What is claimed is:

1. A tire casing comprising a tread and side walls and reinforced side beads, and having imbedded therein a plurality of layers of flat tapes relatively narrow with respect to their length and extending diagonally around the casing from one bead to the other, said tapes being arranged closely adjacent side by side in the layers to form substantially uniform layers, each tape being made up of strands of substantially uniform diameter braided together with each strand crossing over and under other strands diagonally back and forth across the tape and formed with reverse bends at the edges of the tape so that the tape is longitudinally resilient in both tension and compression, some of said strands being non-metallic yielding material and the others being metal wires.

2. A tire casing comprising a tread and side walls and reinforced side beads, and having imbedded therein a plurality of layers of flat tapes relatively narrow with respect to their length and extending diagonally around the casing from one bead to the other, said tapes being arranged closely adjacent side by side in the layers to form substantially uniform layers, each tape being made up of strands of substantially uniform diameter braided together with each strand crossing over and under other strands diagonally back and forth across the tape and formed with reverse bends at the edges of the tape so that the tape is longitudinally resilient in both tension and compression, and is formed with interstices of a width substantially equal to the diameter of the strands, some of said strands being metal wires and others being non-metallic yielding material carrying bonding material, the material of the casing being bonded to the strands and to itself through said interstices.

3. A tire casing comprising a tread and side walls and reinforced side beads, and having imbedded therein a plurality of layers of flat tapes relatively narrow with respect to their length and extending diagonally around the casing from one bead to the other, said tapes being arranged closely adjacent side by side in the layers to form substantially uniform layers, each tape being made up of strands of substantially uniform diameter braided together with each strand crossing over and under other strands diagonally back and forth across the tape and formed with reverse bends at the edges of the tape so that the tape is longitudinally resilient in both tension and compression, and is formed with interstices of a width substantially equal to the diameter of the strands, at least a part of said strands being metal wires, and additional strands of non-metallic yielding material extending lengthwise of the tape and back and forth through said interstices from one side of the tape to the other.

ROBERT C. PIERCE.